(12) United States Patent
Huang et al.

(10) Patent No.: US 11,734,373 B2
(45) Date of Patent: Aug. 22, 2023

(54) METHOD, APPARATUS, DEVICE AND COMPUTER STORAGE MEDIUM FOR DETERMINING SEARCH RESULT

(71) Applicant: BAIDU ONLINE NETWORK TECHNOLOGY (BEIJING) CO., LTD., Beijing (CN)

(72) Inventors: Jizhou Huang, Beijing (CN); Haifeng Wang, Beijing (CN); Wei Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/602,304

(22) PCT Filed: May 28, 2020

(86) PCT No.: PCT/CN2020/092742
§ 371 (c)(1),
(2) Date: Mar. 24, 2022

(87) PCT Pub. No.: WO2021/128729
PCT Pub. Date: Jul. 1, 2021

(65) Prior Publication Data
US 2022/0237251 A1 Jul. 28, 2022

(30) Foreign Application Priority Data
Dec. 27, 2019 (CN) .......................... 201911373544.1

(51) Int. Cl.
*G06F 16/9535* (2019.01)
*G06F 16/9538* (2019.01)

(52) U.S. Cl.
CPC ...... *G06F 16/9538* (2019.01); *G06F 16/9535* (2019.01)

(58) Field of Classification Search
CPC .............. G06F 16/951; G06F 16/9535; G06F 16/9536; G06F 16/9538
See application file for complete search history.

(56) References Cited

U.S. PATENT DOCUMENTS

| 2016/0188726 | A1 | 6/2016 | Shang et al. |
| 2019/0130013 | A1 | 5/2019 | Kempf |
| 2019/0377738 | A1* | 12/2019 | Huang .............. G06F 16/24578 |

FOREIGN PATENT DOCUMENTS

| CN | 103425727 A | 12/2013 |
| CN | 103577489 A | 2/2014 |

(Continued)

OTHER PUBLICATIONS

European Search Report of European application No. 20904682.0 dated Jun. 1, 2022, 4 pages.

(Continued)

*Primary Examiner* — Kris E Mackes
(74) *Attorney, Agent, or Firm* — Brooks Kushman P.C.

(57) ABSTRACT

A method includes obtaining a current query of a user, the search history information of the user in a first time period, the search history information of the user in a second time period and candidate search results for the current query, and inputting the current query of the user, the search history information of the user in the first time period, the search history information of the user in the second time period and the candidate search results for the current query into a search result ranking model, and determining search results corresponding to the current query according to scores of the candidate search results, the second time period being greater than the first time period.

20 Claims, 8 Drawing Sheets

(56) References Cited

FOREIGN PATENT DOCUMENTS

| CN | 105528388 A | 4/2016 |
| CN | 105677780 A | 6/2016 |
| CN | 106649605 A | 5/2017 |
| CN | 107506402 A | 12/2017 |
| CN | 108345702 A | 7/2018 |
| CN | 109033140 A | 12/2018 |
| CN | 110196904 A | 9/2019 |
| CN | 110245289 A | 9/2019 |
| CN | 111177551 A | 5/2020 |
| JP | 2018181326 A | 11/2018 |

OTHER PUBLICATIONS

Communication Pursuant to Article 94(3) EPC of European application No. 20904682.0 dated Jun. 13, 2022, 9 pages.

Kadam et al., "Image search result re-ranking using keyword clusters with duplicate avoidance", IEEE International Conference on Computational Intelligence and Computing Research, 2016, 3 pages.

International Search Report of PCT/CN2020/092742 dated Sep. 30, 2020, 7 pages.

Search Report of Chinese Application No. 2019113735441 dated Jul. 27, 2020, 3 pages.

Search Report of Chinese Application No. 2019113735441 dated Feb. 2, 2021, 2 pages.

Zhou et al., "A Document Relevance Based Search Result Re-Ranking", Journal of Chinese Information Processing, vol. 24, No. 3, May 2010, 6 pages.

Yamaguichi et al., Developing TV Program Recommendation System Using Personal Browsing Histories, DEIM Forum 2010 A3-2, 8 pages.

\* cited by examiner

| Chicago | Search by Baidu |

Chicago_Baidu encyclopedia
Chicago, located to the south of Lake Michigan in the middle west of the United States, is the third largest city in the US and also one of world-famous international financial centers. Chicago is located in the central region of the North American Continent and has coordinates 41°39'N and 87°34'W at the center of the city and is one of the largest business central regions and largest futures markets in the US. The number of newly-established enterprises in the city always ranks the first in the US, and the city is listed as the most balanced-developed economy in the US ...
History, administrative districts, geographic environment, natural resources, population and ethnic groups, more>>
https://baike.baidu.com/

Chicago (Douban movie)
Brief introduction of the movie Chicago, commentaries, pictures, preview, movie news, forum, online ticket booking of the movie Chicago... if you found some problems, you may contact Douban movie. The person you pay attention to has not yet written a short commentary...
www.douban.com/doubana···.Baidu snapshot

Chicago (movie directed by US director Rob Marshall in 2002)_Baidu encyclopedia
July 18, 2018-Chicago is based on the stage musical of the same name in Broadway, directed by Rob Marshall, starred by Renee Zellweger, Catherine Zeta Jones, Richard Gere, John C. Reilly etc.
Baidu encyclopedia    Baidu snapshot Other persons further search for        Expand San Francisco Bay Area | The State of Illinois | The State of Texas | O'Hare International Airport Michigan Lake | The State of New York | The State of New Jersey | The State of Michigan Milwaukee | The State of Pennsylvania | The State of Hawaii | The State of Massachusetts

FIG. 1

METHOD, APPARATUS, DEVICE AND COMPUTER STORAGE MEDIUM FOR DETERMINING SEARCH RESULT

This application is the national phase of PCT Application No. PCT/CN2020/092742 filed on May 28, 2020, which claims priority to Chinese Patent Application No. 201911373544.1, filed on Dec. 27, 2019, which are hereby incorporated in their entireties by reference herein.

FIELD OF THE DISCLOSURE

The present disclosure relates to the technical field of computer application, and particularly to a method, apparatus, device and computer storage medium for determining search results in the field of intelligent search.

BACKGROUND OF THE DISCLOSURE

In recent years, to provide users with richer search results and better search experience, mainstream search engines provide recommendations of relevant entities for the user's search. For example, when the user uses a search engine to search for a query "Chicago", recommendations of relevant entities shown in FIG. 1 are provided in a search result page. A left portion of FIG. 1 shows document search results of "Chicago", and a right portion shows entity recommendation results of "Chicago" (the entity recommendation results may also be regarded as a type of search results and be entities related to the entered query). The recommendations are relevant entities such as "San Francisco Bay Area", "the State of Illinois", "the State of Texas", "O'Hare International Airport" and "Michigan Lake". Taking Baidu as an example, the relevant entity recommendation results are displayed in the right-side area of the search result page. Certainly, the relevant entity recommendation results may also be displayed in other areas of the search result page, or the relevant entities may also be displayed in the form of a plurality of categories.

However, the conventional relevant entity recommendation only considers the user's current query, and the same relevant entity recommendation is provided to all users for the same query. However, in this case, the problem of inaccurate relevant entities for ambiguous queries cannot be solved. For example, if the user's current query is "Chicago", whether the user means a city, a movie or an opera cannot be understood. Therefore, it is certain that the user's demand cannot be accurately reflected when relevant entities are recommended.

SUMMARY OF THE DISCLOSURE

In view of the above, the present disclosure provides a method, apparatus, device and computer storage medium for determining search results to facilitate providing the user with search results which can reflect the user's demand more accurately.

In a first aspect, the present disclosure provides a method of determining search results, the method comprising:

obtaining a current query of a user, search history information of the user in a first time period, search history information of the user in a second time period and candidate search results for the current query, and inputting the current query of the user, the search history information of the user in the first time period, the search history information of the user in the second time period and the candidate search results for the current query into a search result ranking model, and determining search results corresponding to the current query according to scores of the candidate search results presented by the search result ranking model, the second time period being greater than the first time period;

wherein the scores of the candidate results presented by the search result ranking model are determined according to first similarity and a second similarity, the first similarity is a similarity between an integration of a vector representation of the current query and a vector representation of the search history information of the user in the first time period, and vector representations of the candidate search results, and the second similarity is a similarity between an integration of the vector representation of the current query and a vector representation of the search history information of the user in the second time period, and vector representations of the candidate search results.

According to a preferred implementation of the present disclosure, the search history information of the user in the first time period comprises: a query sequence before the current query and clicked search results corresponding to respective queries in the query sequence in the same search session;

the search history information of the user in the second time period comprises: queries and clicked search results of the user in the second time period.

According to a preferred implementation of the present disclosure, the vector representation of the search history information of the user in the first time period is obtained in the following manner:

performing weighting process for the vector representations of the queries in the query sequence and vector representations of clicked search results corresponding to the queries by using an attention mechanism, to obtain the vector representation of the search history information of the user in the first time period.

According to a preferred implementation of the present disclosure, the vector representation of the search history information of the user in the second time period is obtained in the following manner:

obtaining a set of queries and a set of clicked search results of the user in the second time period;

performing a word segmentation process for the set of queries and the set of search results, and solving a union to obtain a word set;

performing an encoding process for the word set by using Distributed Bag of Words version of Paragraph Vector PV-DBOW, to obtain the vector representation of the search history information of the user in the second time period.

According to a preferred implementation of the present disclosure, the candidate search results comprise relevant webpages or relevant entities;

the vector representation of the relevant entity is an integrated vector representation of an identification and a name of the relevant entity and an entity description.

According to a preferred implementation of the present disclosure, the method further comprises:

displaying search results corresponding to the current query in a search result page.

In a second aspect, the present disclosure provides a method of training a search result ranking model, the method comprising:

obtaining training samples using a search log, the training samples comprising: a sample query, search history information of a user in the first time period before inputting the sample query, search history information of the user in the second time period before inputting the sample query, search results corresponding to the sample query and conditions of the search results being clicked;

training a ranking model with the training samples to achieve a preset training target; an input of the ranking model comprising the sample query, the search history information of the user in the first time period before inputting the sample query, the search history information of the user in the second time period before inputting the sample query, and search results corresponding to the sample query, and an output of the ranking model including scores of the search results; determining scores presented by the ranking model to the search results according to a first similarity and a second similarity, the first similarity is a similarity between an integration of a vector representation of the sample query and a vector representation of the search history information in the first time period, and vector representations of search results, and the second similarity is a similarity between an integration of the vector representation of the sample query and a vector representation of the search history information in the second time period, and vector representations of the search results; the training target comprising: maximizing a relevancy degree between the conditions of search results being clicked and the scores of the search results;

obtaining a search result ranking model by using the trained ranking model.

According to a preferred implementation of the present disclosure, the search history information of the user in the first time period before inputting the sample query comprises: a query sequence before the sample query and clicked search results corresponding to respective queries in the query sequence in the same search session;

the search history information of the user in the second time period before inputting the sample query comprises: queries and clicked search results of the user in the second time period before inputting the sample query.

According to a preferred implementation of the present disclosure, the vector representation of the search history information of the user in the first time period before inputting the sample query is obtained in the following manner:

performing weighting process for the vector representations of the queries in the query sequence and vector representations of clicked search results corresponding to the queries by using an attention mechanism, to obtain the vector representation of the search history information of the user in the first time period.

According to a preferred implementation of the present disclosure, the vector representation of the search history information of the user in the second time period before inputting the sample query is obtained in the following manner:

obtaining a set of queries and a set of clicked search results of the user in the second time period before inputting the sample query;

performing a word segmentation process for the set of queries and the set of search results, and solving a union to obtain a word set;

performing an encoding process for the word set by using Distributed Bag of Words version of Paragraph Vector PV-DBOW, to obtain the vector representation of the search history information of the user in the second time period before inputting the sample query.

According to a preferred implementation of the present disclosure, the search results comprise relevant webpages or relevant entities;

the vector representation of the relevant entity is an integrated vector representation of an identification and a name of the relevant entity and an entity description.

According to a preferred implementation of the present disclosure, the search results comprise: a first type of search results and a second type of search results;

the ranking model comprises: a shared vector sub-model, a first ranking sub-model and a second ranking sub-model;

inputting the sample query, the search history information of the user in the first time period before inputting the sample query, the search history information of the user in the second time period before inputting the sample query and search results corresponding to the sample query into the shared vector sub-model to obtain an integration of a vector representation of the sample query and a vector representation of the search history information in the first time period output by the shared vector sub-model, and an integration of the vector representation of the sample query and a vector representation of the search history information in the second time period output by the shared vector sub-model;

inputting the output of the shared vector sub-model and the first type of search results of the sample query into the first ranking sub-model to obtain scores of the first type of search results; and inputting the output of the shared vector sub-model and the second type of search results of the sample query into the second ranking sub-model to obtain scores of the second type of search results;

performing joint training for the first ranking sub-model and second ranking sub-model to achieve a preset training target, the training target comprising: maximizing a relevancy degree between conditions of the first type of search results being clicked and the scores of the first type of search results, and maximizing a relevancy degree between conditions of the second type of search results being clicked and the scores of the second type of search results;

after completion of the training, obtaining the search result ranking model by using the shared vector sub-model and one of the first ranking sub-model and the second ranking sub-model.

According to a preferred implementation of the present disclosure, when performing the joint training for the first ranking sub-model and second ranking sub-model, the method comprises:

in a training iteration process, randomly selecting one of the first ranking sub-model and second ranking sub-model each time for training, and using the output of the selected sub-model to update model parameters of the selected sub-model and the shared vector sub-model; or in the training iteration process, alternatingly selecting one of the first ranking sub-model and second ranking sub-model each time for training, and using the output of the selected sub-model to update model parameters of the selected sub-model and the shared vector sub-model; or in the training iteration process, training both the first ranking sub-model and the second ranking sub-model each time, and using outputs of the first ranking sub-model and second ranking sub-model to update model parameters of all sub-models.

In a third aspect, the present disclosure provides an apparatus of determining search results, the apparatus comprising:

an obtaining unit configured to obtain a current query of a user, search history information of a user in a first time period, search history information of the user in a second time period and candidate search results for the current query;

a determining unit configured to input the current query of the user, the search history information of the user in the first time period, the search history information of the user in the second time period and the candidate search results for the current query into a search result ranking model, and determine search results corresponding to the current query according to scores of the candidate search results presented by the search result ranking model, the second time period being greater than the first time period;

the scores of the candidate results presented by the search result ranking model are determined according to first similarity and a second similarity, the first similarity is a similarity between an integration of a vector representation of the current query and a vector representation of the search history information of the user in the first time period, and vector representations of the candidate search results, and the second similarity is a similarity between an integration of the vector representation of the current query and a vector representation of the search history information of the user in the second time period, and vector representations of the candidate search results.

In a fourth aspect, the present disclosure provides an apparatus of training a search result ranking model, the apparatus comprising:

a sample obtaining unit configured to obtain training samples using a search log, the training samples comprising: a sample query, search history information of a user in the first time period before inputting the sample query, search history information of the user in the second time period before inputting the sample query, search results corresponding to the sample query and conditions of the search results being clicked;

a model training unit configured to train a ranking model with the training samples to achieve a preset training target; an input of the ranking model comprises the sample query, the search history information of the user in the first time period before inputting the sample query, the search history information of the user in the second time period before inputting the sample query, and search results corresponding to the sample query, and an output of the ranking model includes scores of search results; determine scores presented by the ranking model to the search results according to a first similarity and a second similarity, the first similarity is a similarity between an integration of a vector representation of the sample query and a vector representation of the search history information in the first time period, and vector representations of search results, and the second similarity is a similarity between an integration of the vector representation of the sample query and a vector representation of the search history information in the second time period, and vector representations of the search results; the training target comprising: maximizing a relevancy degree between the conditions of search results being clicked and the scores of the search results;

a model obtaining unit configured to obtain a search result ranking model by using the trained ranking model.

According to a fifth aspect, the present disclosure provides an electronic device, comprising:

at least one processor; and a memory communicatively connected with the at least one processor; wherein, the memory stores instructions executable by the at least one processor, and the instructions are executed by the at least one processor to enable the at least one processor to execute the above method.

According to a sixth aspect, the present disclosure provides a non-transitory computer-readable storage medium storing computer instructions therein, wherein the computer instructions are used to cause the computer to execute the above method.

As can be seen from the above technical solutions, in the present disclosure, the information of the search context reflected by the user's short-term search history and the user's personalized preferences reflected by the long-term search history are comprehensively considered when determining the search results, thereby improving the accuracy of the search results and making the search results better meet the user's search demands When it is applied to entity recommendation, the ambiguity of the current query can be removed, and more accurate relevant entities better meeting the user's search demands can be provided.

Other effects of the above optional manners will be described below in conjunction with specific embodiments.

BRIEF DESCRIPTION OF DRAWINGS

The figures are intended to facilitate understanding the solutions, not to limit the present disclosure. In the figures, FIG. 1 illustrates a diagram of an example of providing relevant entity recommendations in a search result page;

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

A method according to the present disclosure is applied to a search engine of a computer system and implemented by a processor or a processor. The method may be set in a server end and used to use the user's historical queries to improve the effect of determining search results. When the user enters a current query through a browser or client, the browser or client sends the current query to the server end. After determining the search results by the method according to embodiments of the present disclosure, the server end sends the search results to the browser or client. The search results involved in embodiments of the present application may include relevant entities or relevant webpages. That is to say, relevant entities may be recommended for the current query in the manner according to the present disclosure, or relevant webpages may be recommended for the current query in the manner according to the present disclosure.

In the subsequent embodiments, an example is taken in which relevant entities are recommended for the current query. A similar principle applies to the recommendation of relevant webpages. The present disclosure will be described in detail in conjunction with embodiments.

Embodiment 1

Figure 2:
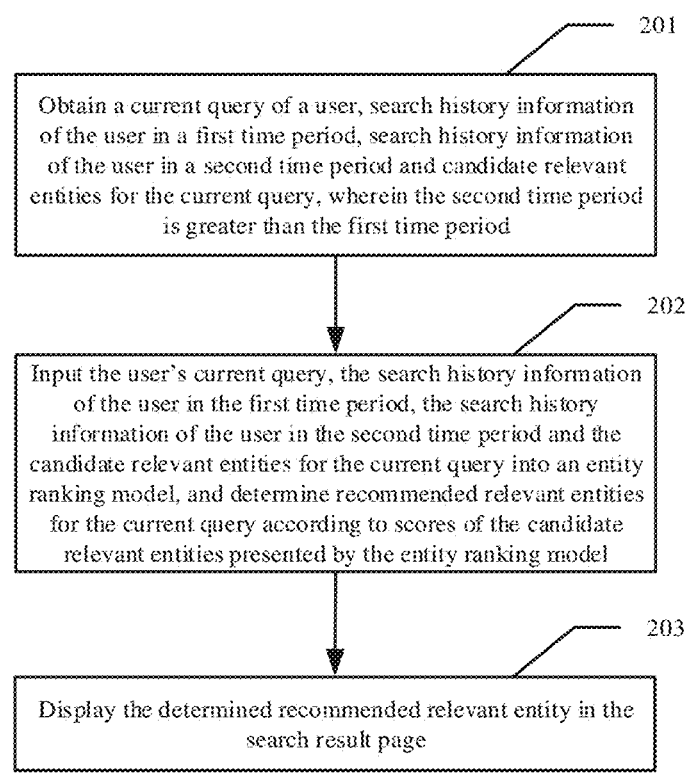
FIG. 2 illustrates a flow chart of a relevant entity recommendation method according to Embodiment 1 of the present disclosure.

FIG. 2 illustrates a flow chart of a relevant entity recommendation method according to Embodiment 1 of the present disclosure. As shown in FIG. 2, the method may include the following steps:

At 201, a current query of a user, search history information of the user in a first time period, search history information of the user in a second time period and candidate relevant entities for the current query are obtained, wherein the second time period is greater than the first time period.

The conventional entity recommendation system is only based on the recommendations for the current query which refers to the query currently input by the user, and cannot understand the user's real search demand, so that the relevant entity recommendations are inaccurate and the user's demand is not met.

It is discovered after research that the search history may provide very valuable cues which may better help capture the user's real demand The search history may be classified into two types: short-term search history and long-term search history. The short-term search history may correspond to the search history information of the user in the first time period in the present disclosure, and the long-term search history may correspond to the search history information of the user in the second time period in the present disclosure.

The short-term search history may include previous user behaviors in the same search session as the current query, for example, a query sequence before the current query and clicked search results corresponding to respective queries in the query sequence in the same search session. The clicked search results may be clicked webpages or clicked relevant entities in the search result page. The short-term search history may be regarded as context information of the current query, and reflect the user's short-term instant interest. If the user once searched for "Dream Girls" in the same session before the user searches for "Chicago", the user is very probably more interested in movies. Likewise, if the user once clicked a search result or a recommended entity related to an opera before the user searches for "Chicago", the user might be more interested in operas.

The "session" mentioned above refers to a search session. Here, a widely-used manner of determining a search session may be used. If the user does not have any search behavior before the first time period (e.g., 30 minutes), a first search behavior in the first time period may be regarded as the start of the current session. That is to say, if the user has continuous search behaviors within 30 minutes, the continuous search behaviors within the 30 minutes all belong to the same session.

The long-term search history refers to the user's all search behaviors within the second time period before the current query, includes the user's all search behaviors in all sessions within the second time period, and includes the input queries, clicked webpages and clicked relevant entities in the search result page. The long-term search history reflects the user's long-term intrinsic interest preference. If a user often searches for queries related to operas and clicks webpages and relevant entities related to the opera, when the user searches for "Chicago", entities related to the opera are preferably recommended to the user. The long-term search history is very helpful for constructing a personalized entity recommendation system.

In the present disclosure, the abovementioned first time period may be on the order of minutes or hours, e.g., 30 minutes. The second time period may be on the order of days or months, e.g., 3 months.

A manner of obtaining candidate relevant entities for the current query is not limited in embodiments of the present disclosure. For example, entities co-occurring with the current query within a preset length window may be selected from a text set, and entities satisfying preset co-occurrence times may be regarded as candidate relevant entities for the current query.

At 202, the current query of the user, the search history information of the user in the first time period, the search history information of the user in the second time period and the candidate relevant entities for the current query are input into an entity ranking model, and recommended relevant entities for the current query are determined according to scores of the candidate relevant entities presented by the entity ranking model.

A search result ranking model determines the scores of the candidate results according to first similarity and second similarity, the first similarity is a similarity between an integration of a vector representation of the current query and a vector representation of the search history information of the user in the first time period, and vector representations of the candidate relevant entities, and the second similarity is a similarity between an integration of the vector representation of the current query and a vector representation of the search history information of the user in the second time period, and vector representations of the candidate relevant entities.

In the embodiment of the present disclosure, the entity ranking model is used to score the candidate relevant entities of the current query to thereby determine the recommended relevant entities for the current query according to the scores. For example, the candidate relevant entities whose scores meet a certain requirement may be taken as the recommended relevant entities, and positions for displaying the recommend relevant entities may further be ranked according to the scores. The certain requirement that the scores meet may include: the scores rank top M, M being a preset positive integer; or the scores exceed a preset threshold.

In the embodiment of the present disclosure, the entity ranking model is pre-trained with training data, and a method of training the entity ranking model will be described in detail in Embodiment 2.

Figure 3:
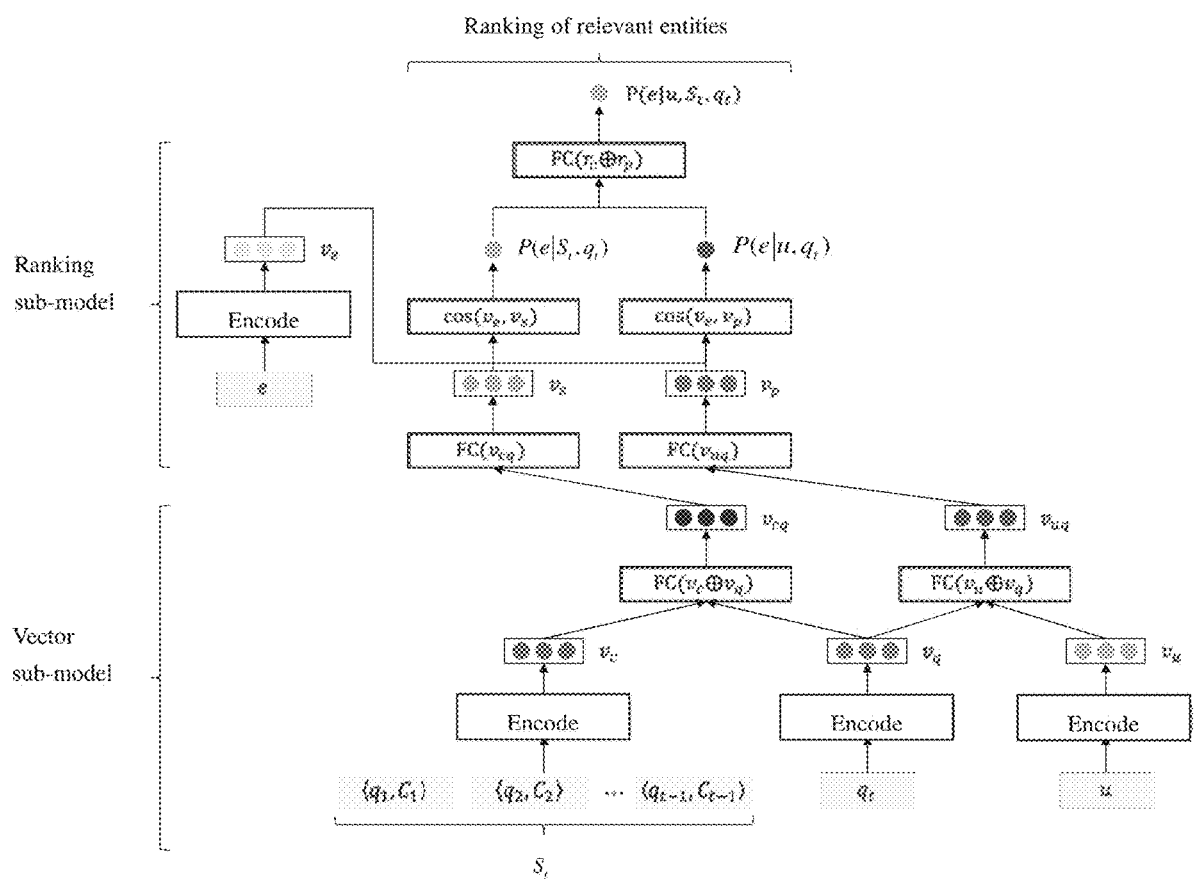
FIG. 3 illustrates a structural schematic diagram of an entity ranking model according to Embodiment 1 of the present disclosure.

The trained entity ranking model can output scores of the candidate relevant entities according to the current query of the user, the search history information of the user in the first time period, the search history information of the user in the second time period and the candidate relevant entities for the current query which are input. The entity ranking model may be structured as shown in FIG. 3, and comprise a vector sub-model and a ranking sub-model.

The current query, the search history information of the user in the first time period and the search history information of the user in the second time period are taken as an input of the vector sub-model, and the vector sub-model outputs an integration of the vector representation of the current query and the vector representation of the search history information of the user in the first time period. The output of the vector sub-model and the candidate relevant entities for the current query are taken as an input of the ranking sub-model, and the ranking sub-model outputs the scores of the candidate relevant entities.

The vector sub-model is first introduced below: The input current query is represented as $q_t$ in in the figure, may be encoded through a neural network to obtain the vector representation $v_q$ of the current query. The neural network is preferably a BiLSTM network (Bidirectional Long Short-Term Memory network). Specifically, given a query, $q_t=[w_1, w_2, \ldots, w_n]$, and $w_i$ is converted into a vector representation by a word vector matrix, then the query $q_t$ is encoded into $[\vec{h}_1, \vec{h}_2, \ldots, \vec{h}_n]$ and $[\overleftarrow{h}_1, \overleftarrow{h}_2, \ldots, \overleftarrow{h}_n]$ respectively by using a forward LSTM and a backward LSTM, and finally, $\vec{h}_n$ and $\overleftarrow{h}_n$ are concatenated as the vector representation $v_q=[\vec{h}_n; \overleftarrow{h}_n]$ of the query $q_t$.[;] represents the concatenation of the vectors.

The search history information of the user in the first time period is represented as $S_t$ in the figure, $S_t=\{<q_1,C_1>, \ldots <q_{t-1}, C_{t-1}>\}$, $S_t$ is formed by the query sequence $q_1, \ldots, q_{t-1}$ before $q_t$ in the same session and the corresponding clicked search results into $C_1, \ldots, C_{t-1}$, where $C_i$ may include the clicked webpage and/or clicked relevant entities.

First, the $q^i$ may be encoded through the neural network (in the same manner as $q_t$) to obtain a vector representation $v_{qi}$, then the clicked webpage in $C_i$ is represented as the vector $v_i^d=[v_i^{d_1}, v_i^{d_2}, \ldots, v_i^{d_l}]$, and the clicked relevant entity in $C_i$ is represented as $v_i^e=[v_1^{e_1}, v_i^{e_2}, \ldots, v_i^{e_g}]$, where l is the number of the clicked webpages in $C_i$, and g is the number of the clicked relevant entities in $C_i$. When the vector representations of the clicked webpages are determined, the neural network may be employed to encode the titles of the clicked webpages, to respectively obtain the vectors $v_i^{d_1}$, $v_i^{d_2}, \ldots, v_i^{d_l}$ of the clicked webpages. When the vector representations of the clicked entities are determined, identifications and names of the entities, and vector representations of entity descriptions are concatenated, then activation processing is performed in conjunction with certain bias parameters to obtain the vector representations $v_1^{e_1}$, $v_i^{e_2}, \ldots, v_i^{e_g}$ of the clicked entities. The method of determining the vector representations of the entities can effectively solve the OOV (Out-Of-Vocabulary) issue and ambiguity issue.

The entity description may be understood as a "description text" of the entity and used to describe the meaning of the entity. In the present disclosure, the entity description may employ a first sentence of the text of an encyclopedic item corresponding to the entity, or employ a digest of the encyclopedic item corresponding to the entity.

Then, the vector representation $v_{qi}^s$ of $<q_i,C_i>$ is generated using $v_{qi}, v_i^d, v_i^d$ by a weighted average method based on an attention mechanism. Specifically, the following equation may be employed:

$$v_{qi}^s = v_{qi} + \text{Attention}_w(v_{qi}, [v_i^{d_1}, v_i^{d_2}, \ldots, v_i^{d_l}, v_i^{e_1}, v_i^{e_2}, \ldots, v_i^{e_g}])$$

Finally, the vector representation $v_c$ of $S_t$ may be obtained by using the following equation:

$$v_c = \text{Attention}_w(v_a, [v_{q_1}^s, v_{q_2}^s, \ldots, v_{q_{t-1}}^s])$$

where a function symbol $\text{Attention}_w(\bullet,\bullet)$ represents a weight representation method based on the attention mechanism. $v_a$ is a model parameter and obtained by learning during model training.

Since the search history information of the user in the second time period represents the user's personalized preference, so it is represented as u in the figure and taken as a user representation. Word segmentation processing is performed respectively for the query set Q of the user, a set D of clicked webpages and a set E of the clicked relevant entities in the second time period to respectively obtain word sets $W_q, W_d, W_e$, a union is calculated to obtain $W_u$, where $W_u=W_q \cup W_d \cup W_e$. Then, the union $W_u$ is encoded by using PV-DBOW (Distributed Bag of Words version of Paragraph Vector) to obtain the vector representation of each user (i.e., the vector representation of the search history of the user in the second time period), represented as $v_u$ in the figure. PV-DBOW is already a currently mature processing manner, and can output a corresponding vector representation after the word set is input.

Then, $v_q$ and $v_c$ are concatenated to obtain an integrated vector representation $v_{cq}$. Certainly, in addition to concatenation, other vector integration manners may also be employed. In the figure, $FC(v_c \oplus v_q)$ represents the integration of vectors $v_q$ and $v_c$. $v_q$ and $v_u$ are concatenated to obtain an integrated vector representation $v_{uq}$. Certainly, in addition to concatenation, other vector integration manners may also be employed. In the figure, $FC(v_u \oplus v_q)$ represents the integration of vectors $v_q$ and $v_u$.

So far, the vector sub-model outputs two integrated vector representations: $v_{cq}$ and $v_{uq}$.

The ranking sub-model is introduced below:

$v_{cq}, v_{uq}$ and a candidate relevant entity e are taken as the input of the ranking sub-model. The ranking sub-model ranks by using the two similarities: the first similarity and second similarity.

The first similarity is the similarity between an integration of the vector representation of the current query and a vector representation of the search history information of the user in the first time period, and the vector representation of the candidate relevant entity. The first similarity $P(e|S_t, q_t)$ may be calculated with the following equation:

$$P(e \mid S_t, q_t) = \cos(v_e, v_s) = \frac{v_e^T v_s}{\|v_e\| \|v_s\|}$$

where $v_e$ represents the vector representation of the relevant entity e; the identification and name of the entity e, and the vector representation of the entity description are concatenated, then activation processing is performed in conjunction with a certain bias parameter to obtain the vector representation $v_e$ of the entity e.

$v_s$ is a vector representation obtained by mapping $v_{cq}$ via a fully-connected layer (FC layer) and may be calculated with the following equation:

$$v_s = \varphi(W_s v_{cq} + b_s)$$

where $W_s$ is a parameter matrix, $b_s$ is an offset vector, $\varphi(\bullet)$ is an activation function. $W_s$ and $b_s$ are model parameters and obtained by learning during model training.

The second similarity is the similarity between an integration of the vector representation of the current query and a vector representation of the search history information of the user in the second time period, and the vector representation of the candidate relevant entity. The first similarity $P(e|S_t, q_t)$ may be calculated with the following equation:

$$P(e|u, q_t) = \cos(v_e, v_p) = \frac{v_e^T v_p}{\|v_e\|\|v_p\|}$$

$v_p$ is a vector representation obtained by mapping $v_{uq}$ via a fully-connected layer (FC layer) and may be calculated with the following equation:

$$v_p = \varphi(W_u v_{uq} + b_u)$$

where $W_u$ is a parameter matrix, $b_u$ is an offset vector, $\varphi(\cdot)$ is an activation function. $W_u$ and $b_u$ are model parameters and obtained by learning during model training.

Finally, when scoring the candidate relevant entity e, the ranking sub-model may use the first similarity and second similarity comprehensively, specifically:

$$P(e|u, S_t, q_t) = \varphi(W_f[P(e|S_t, q_t); P(e|u, q_t)] + b_f)$$

where $W_f$ is a parameter matrix, $b_f$ is an offset value, $\varphi(\cdot)$ is an activation function. $W_f$ and $b_f$ are model parameters and obtained by learning during model training.

The higher $P(e|u, S_t, q_t)$ of the candidate relevant entity e is, the higher the corresponding score value is.

At 203, the determined recommended relevant entity is displayed in the search result page.

In the embodiment of the present disclosure, the recommended relevant entity may be displayed in the search result page of the current query. For example, the right-side area of the search result page of the current query displays the recommended relevant entity. Certainly, in addition, the recommended relevant entity may also be displayed at other positions of the search result page. The position of displaying the recommended relevant entity in the search result page is not limited in the present disclosure.

For example, the user inputs the current query "Chicago", the user also searches for "Titanic" and "Moulin Rouge" in the same session, and the user searched and clicked a lot of content relative to movies in the past three months. By the method of the embodiment of the present disclosure, in the candidate relevant entities related to the query "Chicago", the scores of the movie-related candidate relevant entities are high, so the movie-related candidate entities are taken as the recommended relevant entities. It is possible to, in this manner, exclude the ambiguity of the current query, and consider the information of the context as well as the personalized preferences reflected by the user's long-term search history, so that the recommendation of the relevant entity can better meet the user's actual needs. In the conventional relevant entity recommendation, the same relevant entity is recommended to all users regarding the current query "Chicago", e.g., the entity related to the city "Chicago" is recommended to all users by default.

Embodiment 2

Figure 4:
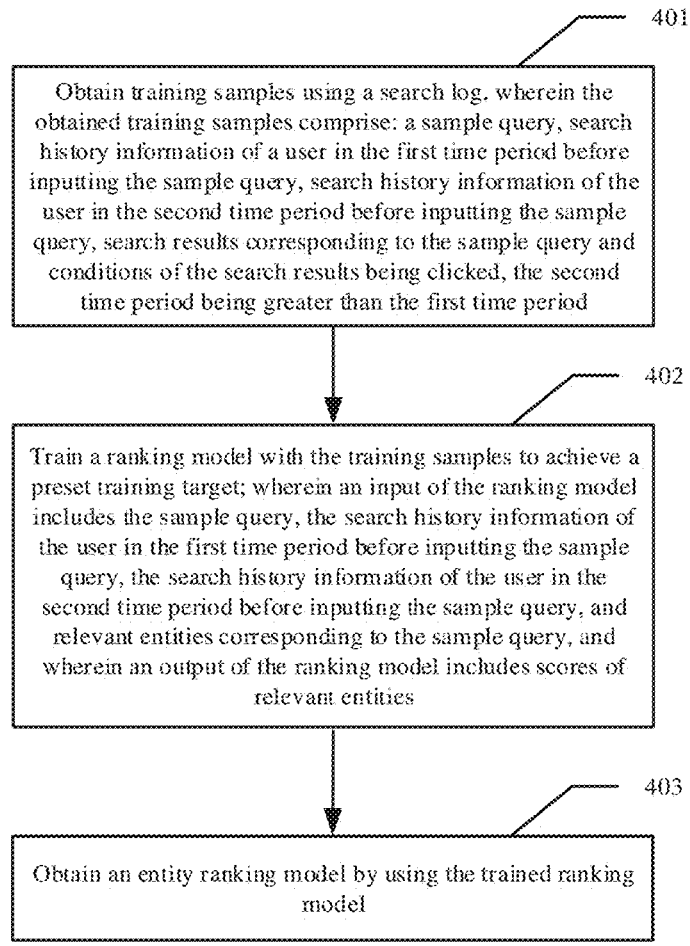
FIG. 4 illustrates a flow chart of a method of training the entity ranking model according to Embodiment 2 of the present disclosure.

FIG. 4 illustrates a flow chart of a method of training the entity ranking model according to Embodiment 2 of the present disclosure. As shown in FIG. 4, the method may include the following steps:

At 401, training samples are obtained using a search log.

The obtained training samples include a sample query, search history information of a user in the first time period before inputting the sample query, search history information of the user in the second time period before inputting the sample query, search results corresponding to the sample query and conditions of the search results being clicked, the second time period being greater than the first time period.

In the present disclosure, a search log within a continuous time period is obtained to extract the above training samples therefrom.

As in Embodiment 1, the search history information of the user in the first time period before inputting the sample query may include previous user behaviors n the same search session as the sample query, for example, a query sequence before the sample query and clicked search results corresponding to respective queries in the query sequence in the same search session. However, as a preferred embodiment, in the training samples, the clicked search results are taken as positive examples, and unclicked search results may be obtained as negative examples. The search results may be webpages in the search result page, or relevant entities.

The search history information of the user in the second time period before inputting the sample query may include all user search behaviors in all sessions within the second time period, and include the input query, clicked webpages in the search result page, and clicked relevant entities.

At 402, a ranking model is trained with the training samples to achieve a preset training target.

An input of the ranking model includes the sample query, the search history information of the user in the first time period before inputting the sample query, the search history information of the user in the second time period before inputting the sample query, and relevant entities corresponding to the sample query. An output of the ranking model includes scores of relevant entities.

The scores provided for the relevant entities are determined according to first similarity and a second similarity, the first similarity is a similarity between an integration of a vector representation of the sample query and a vector representation of the search history information in the first time period, and vector representations of relevant entities corresponding to the sample query, and the second similarity is a similarity between an integration of the vector representation of the sample query and a vector representation of the search history information in the second time period, and vector representations of relevant entities corresponding to the sample query The training target includes: maximizing a relevancy degree between the conditions of relevant entities being clicked and the scores of the relevant entities. In the present embodiment, the ranking model shown in FIG. 3 may be trained, the sample query is taken as $q_t$ in FIG. 3, the search history information of the user within the first time period before inputting the sample query is taken as $S_t$ in FIG. 3, the search history information of the user within the second time period before inputting the sample query is taken as u in FIG. 3, and they are processed by the vector sub-model to obtain two integrated vector representations: $v_{cq}$ and $v_{ug}$, where $v_{cq}$ is obtained by integrating the vector representation $v_q$ of $q_t$ and the vector representation $v_c$ of $S_t$, and $v_{uq}$ is obtained by integrating the vector representation $v_q$ of $q_t$ and the vector representation $v_u$ of u. Reference may be made to relevant depictions in Embodiment 1 for the specific processing procedure of the vector sub-model. No detailed depictions will be presented any more here.

$v_{cq}$, $v_{uq}$ and a relevant entity e are taken as the input of the ranking sub-model. The ranking sub-model obtains the first similarity $P(e|S_t, q_t)$ and the second similarity $P(e|u, q_t)$ in the manner in Embodiment 1, then obtain $P(e|u, S_t, q_t)$ of the relevant entity e, and outputs a score of the relevant entity e according to $P(e|u, S_t, q_t)$. The higher $P(e|u, S_t, q_t)$ of the relevant entity e is, the higher the corresponding score value is.

During training, iterative update of model parameters may be performed by pairwise sorting learning and stochastic gradient descent. In the embodiment of the present disclosure, the training target of the ranking sub-model may take a form of minimizing a preset loss function. The loss function Loss may be determined by using a negative log-likelihood function of the clicked entity in the training samples, for example, $$loss_e = -\log \prod_{(u, S_t, q_t, e^+) \in \mathcal{T}_e} f(e^+ | u, S_t, q_t)$$

where $e^+$ is the clicked relevant entity of the sample query. $\mathcal{T}_e = \{(u_e, S_t, q_t, E_t)\}$ is a set of training samples employed for entity ranking.

$$f(e^+ | u, S_t, q_t) = \frac{\exp(\gamma P(e^+ | u, S_t, q_t))}{\sum_{e \in E_t} \exp(\gamma P(e | u, S_t, q_t))}$$

where $E_t$ is a set of relevant entities for the sample query, and $\gamma$ is a preset parameter.

During training, a gradient is calculated with $loss_e$, and parameters of the ranking sub-model are constantly iteratively updated until an iteration stop condition is satisfied. The iteration stop condition may include but not limited to: $loss_e$ converges, $loss_e$ is smaller than a preset threshold, or iteration times reach a preset times threshold.

At 403, an entity ranking model is obtained by using the trained ranking model.

Upon completion of training, the model shown in FIG. 3 may be used as the entity ranking model. The entity ranking model includes a vector sub-model and a ranking sub-model.

In addition to the above training manner, the present disclosure provides a multitask learning framework by providing a preferred training manner in Embodiment 3, i.e., obtain the entity ranking model in a joint training manner using a multitask model.

Embodiment 3

To a certain degree, the entity ranking has a problem that the entity click data is sparse because due to the limitation of the display space, the entity ranking of the entity ranking model tends to perform entity recommendation according to the most frequently-mentioned meaning of the query. As for an ambiguous query, in addition to the most frequently-mentioned meaning, the entity click data corresponding to less-mentioned and seldom-mentioned meanings are all very sparse. To better satisfy the user's pluralistic information demands, most search engines provide the user with diversified search results. Therefore, when the user searches, as compared with entity recommendation results, it is easier to find a result matching the user's own demand for information from the webpage search result. In the present embodiment, the whole model may include a shored vector sub-model, a first ranking sub-model and a second ranking sub-model. The first ranking sub-model employs the ranking sub-model stated in Embodiment 2 and serves as a primary task to perform relevant entity ranking. The second ranking sub-model, as a secondary task, is used to perform webpage ranking. This multitask learning model can use the association between different task models to improve the extensibility and ranking effect of the model.

In the present embodiment, the training samples further include webpage search results corresponding to the sample query and conditions of webpages being clicked.

Figure 5:
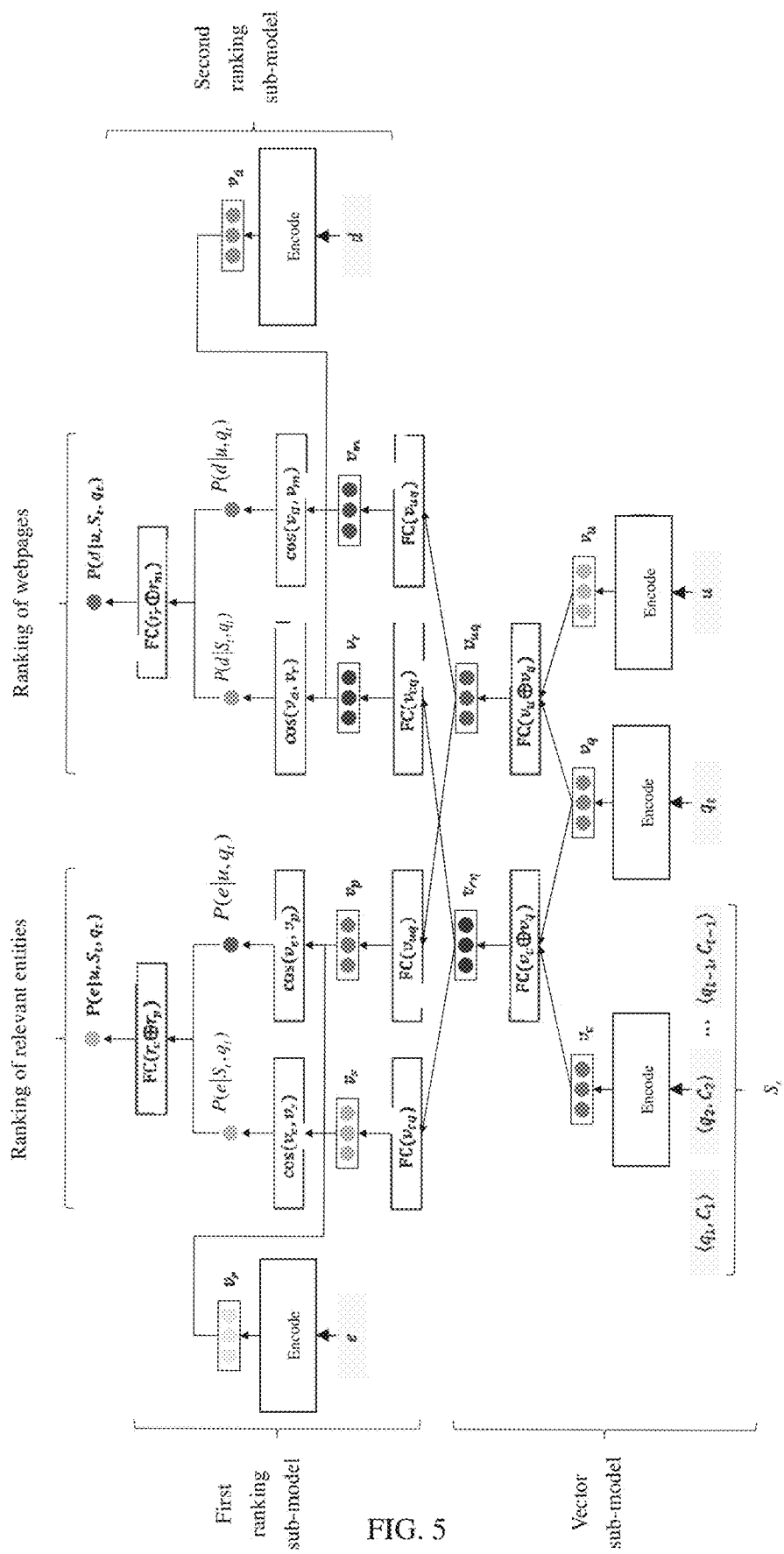
FIG. 5 illustrates a structural schematic diagram of an entity ranking model according to Embodiment 3 of the present disclosure.

Specifically, this model may be shown in FIG. 5. Similar to Embodiment 2, the sample query is taken as $q_t$ in FIG. 5, the search history information of the user within the first time period before inputting the sample query is taken as $S_t$ in FIG. 5, the search history information of the user within the second time period before inputting the sample query is taken as u in FIG. 5, and they are processed by the vector sub-model to obtain two integrated vector representations: $v_{cq}$ and $v_{uq}$, where $v_{cq}$ is obtained by integrating the vector representation $v_q$ of $q_t$ and the vector representation $v_c$ of $S_t$, and $v_{uq}$ is obtained by integrating the vector representation $v_q$ of $q_t$ and the vector representation $v_u$ of u. Reference may be made to relevant depictions in Embodiment 1 for the specific processing procedure of the vector sub-model. No detailed depictions will be presented any more here.

The first ranking sub-model is similar to the ranking sub-model in Embodiment 2. $v_{cq}$, $v_{uq}$ and a relevant entity e are taken as the input of the first ranking sub-model. The ranking sub-model obtains the first similarity $P(e|S_t, q_t)$ and the second similarity $P(e|u, q_t)$ in the manner in Embodiment 1, then obtain $P(e|u, S_t, q_t)$ of the relevant entity e, and outputs a score of the relevant entity e according to $P(e|u, S_t, q_t)$. The higher $P(e|u, S_t, q_t)$ of the relevant entity e is, the higher the corresponding score value is.

$v_{cq}$ and $v_{uq}$ output by the vector sub-model also serve as an input of the second ranking sub-model, and meanwhile the webpage search result d (hereinafter referred to as a candidate webpage) also serve as an input of the second ranking sub-model. The second ranking sub-model ranks d by using two similarities, namely, the first similarity and second similarity.

The first similarity in the second ranking sub-model is a similarity between an integration of a vector representation of the current query and a vector representation of the search history information of the user in the first time period, and vector representations of candidate webpages.

The first similarity $P(e|S_t, q_t)$ may be calculated using the following equation:

$$P(d | S_t, q_t) = \cos(v_d, v_r) = \frac{v_d^T v_r}{\|v_d\|\|v_r\|}$$

where $v_d$ represents a vector representation of the candidate webpage d.

$v_r$ is a vector representation obtained by mapping $v_{cq}$ via a fully-connected layer (FC layer) and may be calculated with the following equation:

$$v_r = \varphi(W_d v_{cq} + b_d)$$

where $W_d$ is a parameter matrix, $b_d$ is an offset vector, $\varphi(\cdot)$ is an activation function. $W_d$ and $b_d$ are model parameters and obtained by learning during model training.

The second similarity is a similarity between an integration of the vector representation of the current query and a vector representation of the search history information of the user in the second time period, and vector representations of candidate webpages. The second similarity $P(d|u,q_t)$ may be calculated using the following equation:

$$P(d \mid u, q_t) = \cos(v_d, v_m) = \frac{v_d^T v_m}{\|v_d\|\|v_m\|}$$

$v_m$ is a vector representation obtained by mapping $v_{uq}$ via a fully-connected layer (FC layer) and may be calculated with the following equation:

$$v_m = \varphi(W_m v_{uq} + b_m)$$

where $W_m$ is a parameter matrix, $b_m$ is an offset vector, $\varphi(\bullet)$ is an activation function. $W_m$ and $b_m$ are model parameters and obtained by learning during model training. Finally, when scoring the candidate webpage d, the second ranking sub-model may use the first similarity and second similarity comprehensively, specifically:

$$P(d|u,S_t,q_t) = \varphi(W_g[P(d|S_t, q_t); P(d|u,q_t)] + b_g)$$

where $W_g$ is a parameter matrix, $b_g$ is an offset value, $\varphi(\bullet)$ is an activation function. $W_g$ and $b_g$ are model parameters and obtained by learning during model training.

The higher $P(d|u, S_t, q_t)$ of the candidate webpage d is, the higher the corresponding score value is.

When joint training of the first ranking sub-model and second ranking sub-model, one of the first ranking sub-model and second ranking sub-model may be selected randomly each time for training, or one of the first ranking sub-model and second ranking sub-model may be selected alternatingly each time for training; then the output of the selected sub-model is used each time to update model parameters of the selected sub-model and the shared vector sub-model.

Selecting alternatingly is taken as an example. When the first ranking sub-model is selected, after training is performed with training samples to obtain $P(e|u,S_t,q_t)$, loss$_e$ is calculated, the model parameters of the shared vector sub-model and the first ranking sub-model are iteratively updated using loss$_e$; then the second ranking sub-model is selected, after training is performed with training samples to obtain $P(d|u, S_t,q_t)$, loss$_d$ is calculated, the model parameters of the shared vector sub-model and the second ranking sub-model are iteratively updated using loss$_d$; so on so forth until the training target is achieved, for example, both loss$_e$ and loss$_d$ converge, both loss$_e$ and loss$_d$ are smaller than a preset threshold, or iteration times reach a preset times threshold.

$$loss_d = -\log \prod_{(u,H_t,q_t,d^+) \in \mathcal{T}_d} f(d^+ \mid u, S_t, q_t)$$

where $d^+$ is a clicked webpage of the sample query. $\bar{t}_d, \bar{t}_{d-1}, \ldots, \bar{t}_1 = \{(u_d, S_t, q_t, D_t)\}$ is a set of training samples corresponding to a webpage ranking model, namely, a second ranking sub-model.

$$f(d^+ \mid u, S_t, q_t) = \frac{\exp(\gamma P(d^+ \mid u, S_t, q_t))}{\sum_{d \in D_t} \exp(\gamma P(d \mid u, S_t, q_t))}$$

where $D_t$ is a set of candidate webpages of the sample query, and $\gamma$ is a preset parameter.

In addition to the above joint training manner, both the first ranking sub-model and the second ranking sub-model are trained each time in the training iteration process, and the outputs of the first ranking sub-model and second ranking sub-model update model parameters of all sub-models. In this manner, an integrated loss function may be employed, for example, $$loss = loss_d + \alpha loss_e$$

where $\alpha$ is a hyperparameter, and may be manually set as an experimental value or empirical value.

Loss is calculated in each iteration process, then the loss is used to update the model parameters of the shared vector sub-model, the first ranking sub-model and second ranking sub-model until the training target is reached. For example, loss converges, loss is smaller than a preset threshold, or iteration times reach a preset times threshold.

After completion of the training, the shared vector sub-model and the first ranking sub-model are used to obtain the entity ranking model. That is to say, during training, training is performed in a multitask model manner, i.e., the second ranking sub-model assists in the training of the first ranking sub-model, but the finally-obtained entity ranking model for performing relevant entity recommendation does not use the second ranking sub-model.

It needs to be appreciated that after the training is performed in the above multitask model training manner, a relevant webpage ranking model may also be obtained, i.e., the relevant webpage ranking model may be obtained using the shared sub-model and the second ranking sub-model. In this manner, the first ranking sub-model assists in the training of the second ranking sub-model, i.e., the relevant entity recommendation assists in the relevant webpage ranking. The thus-obtained relevant webpage ranking model may obtain scores of the relevant webpages in the set of relevant webpages of the current query after the current query, the search history information of the user in the first time period, the search history information of the user in the second time period and the set of relevant webpages of the current query are input, so that the relevant webpages of the current query to be displayed are determined according to the scores as the basis for displaying, selecting and ranking the relevant webpages.

In addition, it needs to be appreciated that the above embodiment is described by taking an example in which the relevant entities and relevant webpages are taken as a first type of search results and a second type of search results, respectively. However, the present disclosure is not limited to the two types of search results, and other types of search results may also be taken as the first type of search results and second type of search results.

The method according to the present disclosure is described in detail above. An apparatus according to the present disclosure will be described below in detail in conjunction with embodiments.

Embodiment 4

Figure 6:
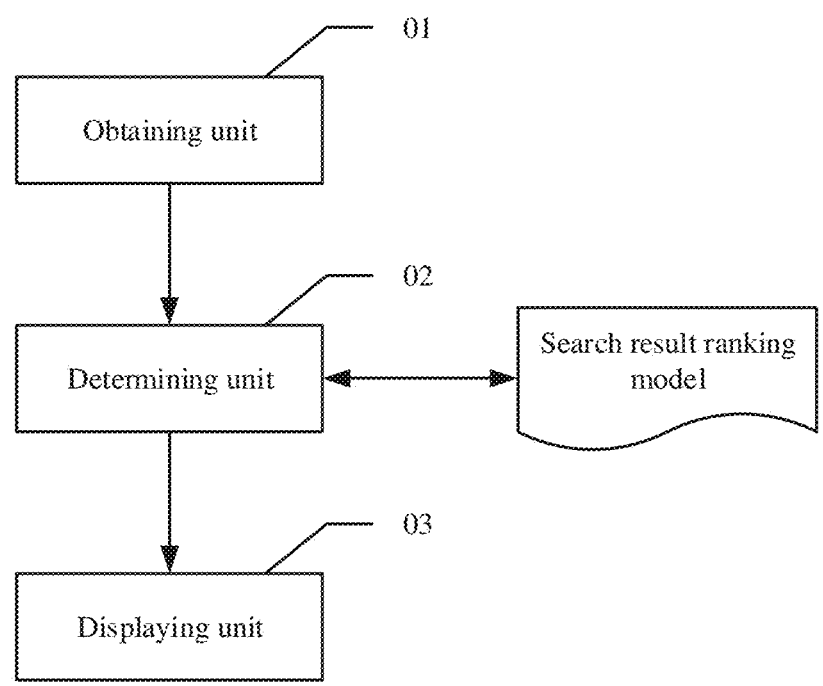
FIG. 6 illustrates a structural schematic diagram of apparatus of determining search results according to an embodiment of the present disclosure.

FIG. 6 illustrates a structural schematic diagram of apparatus of determining search results according to an embodiment of the present disclosure. As shown in FIG. 6, the apparatus may comprises: an obtaining unit 01 and a determining unit 02, and may further comprise a displaying unit 03. Main functions of the units are as follows:

The obtaining unit 01 is configured to obtain a current query of a user, the search history information of the user in a first time period, the search history information of the user in a second time period and candidate relevant entities for the current query.

The determining unit 02 is configured to input the current query of the user, the search history information of the user in the first time period, the search history information of the user in the second time period and the candidate search results for the current query into a search result ranking model, and determine search results corresponding to the current query according to scores of the candidate search results presented by the search result ranking model, the second time period being greater than the first time period.

The scores of the candidate results presented by the search result ranking model are determined according to first similarity and a second similarity, the first similarity is a similarity between an integration of a vector representation of the current query and a vector representation of the search history information of the user in the first time period, and vector representations of the candidate search results, and the second similarity is a similarity between an integration of the vector representation of the current query and a vector representation of the search history information of the user in the second time period, and vector representations of the candidate search results.

The search history information of the user in the first time period comprises: a query sequence before the current query and clicked search results corresponding to respective queries in the query sequence in the same search session. Preferably, the vector representation of the search history information of the user in the first time period is obtained in the following manner: performing weighting process for the vector representations of the queries in the query sequence and vector representations of clicked search results corresponding to the queries by using an attention mechanism, to obtain the vector representation of the search history information of the user in the first time period.

The search history information of the user in the second time period may comprise queries and clicked search results (e.g., clicked webpages or relevant entities) of the user in the second time period. Preferably, the vector representation of the search history information of the user in the second time period is obtained in the following manner: obtaining a set of queries and a set of clicked search results of the user in the second time period; performing a word segmentation process for the set of queries and the set of search results, and solving a union to obtain a word set; performing an encoding process for the word set by using PV-DBOW, to obtain the vector representation of the search history information of the user in the second time period.

The candidate search results may comprise relevant webpages or relevant entities.

The vector representation of the relevant entity is an integrated vector representation of an identification and a name of the relevant entity and an entity description.

Reference may be made to relevant depictions in Embodiment 1 for a specific process of the determining unit 02 determining the search results with the search ranking model. Detailed depictions will not be presented any more here.

The displaying unit 03 is configured to display search results corresponding to the current query in the search result page, i.e., include the search results corresponding to the current_query in the search result page and send the search result page to a browser or a client.

Embodiment 5

Figure 7:
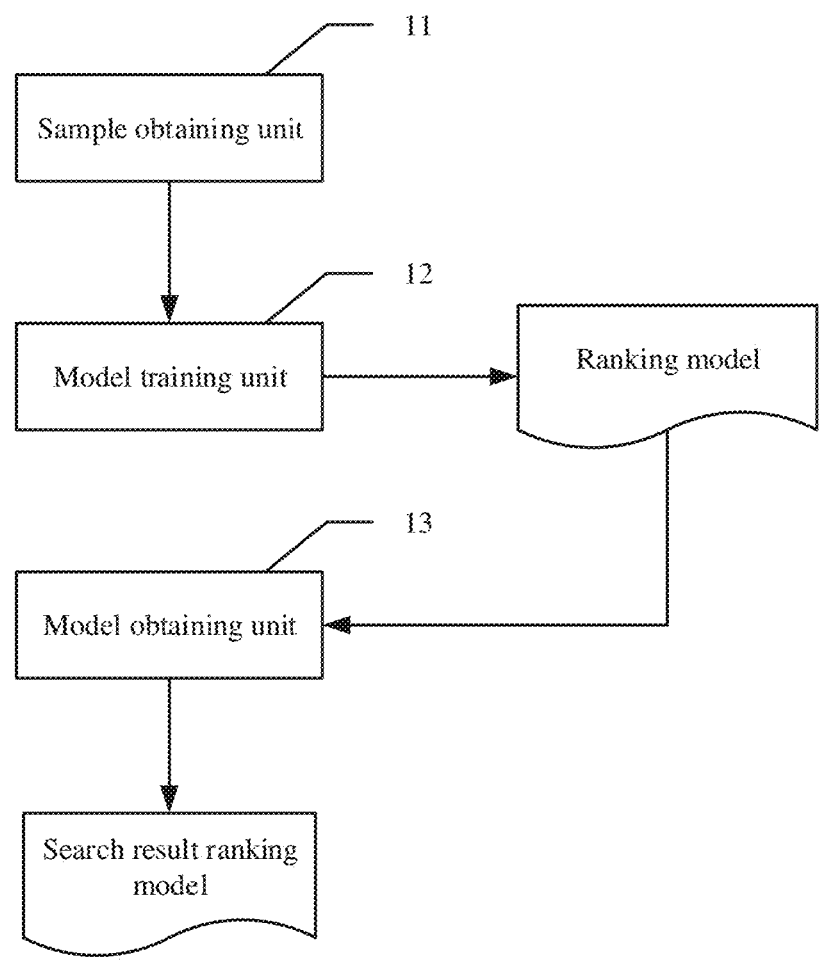
FIG. 7 illustrates a structural schematic diagram of an apparatus of training a search result ranking model according to an embodiment of the present disclosure.

FIG. 7 illustrates a structural schematic diagram of an apparatus of training a search result ranking model according to an embodiment of the present disclosure. As shown in FIG. 7, the apparatus may comprise: a sample obtaining unit 11, a model training unit 12 and a model obtaining unit 13. Main functions of the units are as follows:

The sample obtaining unit 11 is configured to obtain training samples using a search log. The training samples comprise: a sample query, search history information of a user in the first time period before inputting the sample query, search history information of the user in the second time period before inputting the sample query, search results corresponding to the sample query and conditions of the search results being clicked.

The model training unit 12 is configured to train a ranking model with the training samples to achieve a preset training target; an input of the ranking model comprises the sample query, the search history information of the user in the first time period before inputting the sample query, the search history information of the user in the second time period before inputting the sample query, and search results corresponding to the sample query, and the output of the ranking model includes scores of search results; determine scores presented by the ranking model to the search results according to first similarity and a second similarity, the first similarity is a similarity between an integration of a vector representation of the sample query and a vector representation of the search history information in the first time period, and vector representations of search results, and the second similarity is a similarity between an integration of the vector representation of the sample query and a vector representation of the search history information in the second time period, and vector representations of the search results; the training target comprising: maximizing a relevancy degree between the conditions of search results being clicked and the scores of the search results.

The model obtaining unit 13 is configured to obtain a search result ranking model by using the trained ranking model.

The search history information of the user in the first time period before inputting the sample query comprises: a query sequence before the sample query and clicked search results corresponding to respective queries in the query sequence in the same search session.

The vector representation of the search history information of the user in the first time period before inputting the sample query is obtained in the following manner: performing weighting process for the vector representations of the queries in the query sequence and vector representations of clicked search results corresponding to the queries by using an attention mechanism, to obtain the vector representation of the search history information of the user in the first time period before inputting the sample query.

The search history information of the user in the second time period before inputting the sample query comprises queries and clicked search results of the user in the second time period before inputting the sample query.

Preferably, the vector representation of the search history information of the user in the second time period before inputting the sample query is obtained in the following manner: obtaining a set of queries and a set of clicked search results of the user in the second time period before inputting the sample query; performing a word segmentation process for the set of queries and the set of search results, and solving a union to obtain a word set; performing an encoding process for the word set by using PV-DBOW, to obtain the vector representation of the search history information of the user in the second time period before inputting the sample query.

Reference may be made to relevant depictions in Embodiment 2 for a specific manner of the model training unit 12 training the search result ranking model. Detailed depictions will not be presented any more here.

As a preferred embodiment, the above search results comprise: a first type of search results and a second type of search results. The ranking model comprises: a shared vector sub-model, a first ranking sub-model and a second ranking sub-model.

The model training unit 12 is specifically configured to input the sample query, the search history information of the user in the first time period before inputting the sample query, the search history information of the user in the second time period before inputting the sample query and search results corresponding to the sample query into the shared vector sub-model to obtain an integration of a vector representation of the sample query and a vector representation of the search history information in the first time period output by the shared vector sub-model, and an integration of the vector representation of the sample query and a vector representation of the search history information in the second time period output by the shared vector sub-model; input the output of the shared vector sub-model and the first type of search results of the sample query into the first ranking sub-model to obtain scores of the first type of search results; and input the output of the shared vector sub-model and the second type of search results of the sample query into the second ranking sub-model to obtain scores of the second type of search results; performing joint training for the first ranking sub-model and second ranking sub-model to achieve a preset training target, the training target comprising: maximizing a relevancy degree between conditions of the first type of search results being clicked and the scores of the first type of search results, and maximizing a relevancy degree between conditions of the second type of search results being clicked and the scores of the second type of search results.

The model obtaining unit 13 is specifically configured to, after completion of the training of the model training unit, obtain a search result ranking model by using the shared vector sub-model and one of the first ranking sub-model and the second ranking sub-model.

When performing the joint training for the first ranking sub-model and second ranking sub-model, the model training unit 12 specifically performs: in a training iteration process, randomly selecting one of the first ranking sub-model and second ranking sub-model each time for training, and using the output of the selected sub-model to update model parameters of the selected sub-model and the shared vector sub-model; or in the training iteration process, alternatingly selecting one of the first ranking sub-model and second ranking sub-model each time for training, and using the output of the selected sub-model to update model parameters of the selected sub-model and the shared vector sub-model; or in the training iteration process, training both the first ranking sub-model and the second ranking sub-model each time, and using outputs of the first ranking sub-model and second ranking sub-model to update model parameters of all sub-models.

Reference may be made to relevant depictions in Embodiment 3 for a specific process of the model training unit 12 training the search result ranking model. Detailed depictions will not be presented any more here.

According to embodiments of the present disclosure, the present disclosure further provides an electronic device and a readable storage medium.

Figure 8:
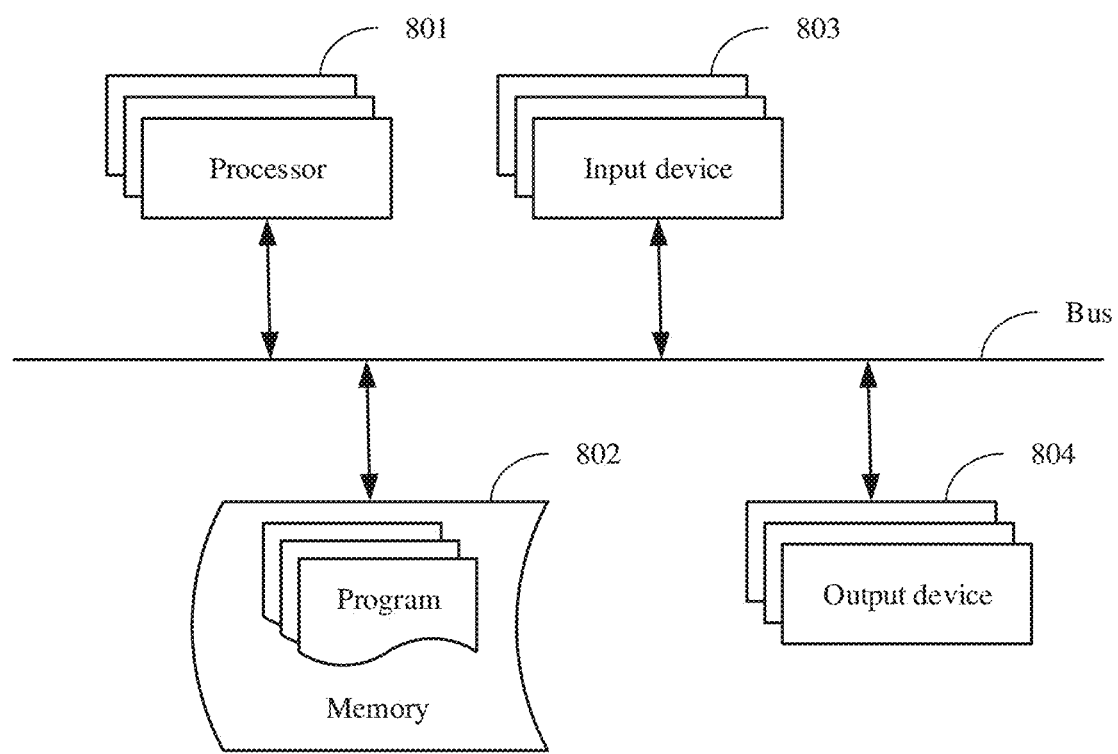
FIG. 8 illustrates a block diagram of an electronic device for implementing embodiments of the present disclosure.

As shown in FIG. 8, it shows a block diagram of an electronic device for implementing the method of determining search results according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 8, the electronic device comprises: one or more processors 801, a memory 802, and interfaces configured to connect components and including a high-speed interface and a low speed interface. Each of the components are interconnected using various buses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 801 is taken as an example in FIG. 8.

The memory 802 is a non-transitory computer-readable storage medium provided by the present disclosure. The memory stores instructions executable by at least one processor, so that the at least one processor executes the method of determining search results according to the present disclosure. The non-transitory computer-readable storage medium of the present disclosure stores computer instructions, which are used to cause a computer to execute the method of determining search results according to the present disclosure.

The memory 802 is a non-transitory computer-readable storage medium and can be used to store non-transitory software programs, non-transitory computer executable programs and modules, such as program instructions/modules corresponding to the method of determining search results in embodiments of the present disclosure. The processor 801 executes various functional applications and data processing of the server, i.e., implements the method of determining search results in the above method embodiments, by running the non-transitory software programs, instructions and modules stored in the memory 802.

The memory 802 may include a storage program region and a storage data region, wherein the storage program region may store an operating system and an application program needed by at least one function; the storage data region may store data created according to the use of the electronic device. In addition, the memory 802 may include a high-speed random access memory, and may also include a non-transitory memory, such as at least one magnetic disk storage device, a flash memory device, or other non-transitory solid-state storage device. In some embodiments, the memory 802 may optionally include a memory remotely arranged relative to the processor 801, and these remote memories may be connected to the electronic device through a network. Examples of the above network include, but are not limited to, the Internet, an intranet, a local area network, a mobile communication network, and combinations thereof.

The electronic device for implementing the method of determining search results may further include an input device 803 and an output device 804. The processor 801, the memory 802, the input device 803 and the output device 804 may be connected through a bus or in other manners. In FIG. 8, the connection through the bus is taken as an example.

The input device 803 may receive inputted numeric or character information and generate key signal inputs related to user settings and function control of the electronic device, and may be an input device such as a touch screen, keypad, mouse, trackpad, touchpad, pointing stick, one or more mouse buttons, trackball and joystick. The output device 804 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

As can be seen from the above depictions, the method, apparatus, device and computer storage medium according to embodiments of the present disclosure may have the following advantages:

1) In the present disclosure, the information of the search context reflected by the user's short-term search history and the user's personalized preferences reflected by the long-term search history are comprehensively considered when determining the search results, thereby improving the accuracy of the search results and making the search results better meet the user's search demands. When it is applied to entity recommendation, the ambiguity of the current query can be removed, and more accurate relevant entities better meeting the user's search demands can be provided.

2) In the present disclosure, when the search result ranking model is trained, assistant training between different search results is achieved through a multitask model learning framework, e.g., relevant webpages assists the training of the relevant entity ranking model, so that the association between different tasks is used to improve the extensibility and accuracy of the model.

3) In the present disclosure, the employed multitask model learning framework can ease the issue of sparse clicked data in the primary task by virtue of an assistant task (i.e., the second ranking sub-model is an assistant task of the first ranking sub-model). The multitask model framework in the present application, through the shared vector representation, implements knowledge migration through the shared vector representation, joint learning of multiple relevant tasks can enhance the generalization capability of the model, and experiments verify that a better training effect is achieved.

4) In the vector representation of the information of the search context reflected by the short-term search history and the vector representation of the user's personalized preferences reflected by the long-term search history, the query, the clicked relevant entities and clicked webpages are fused, thereby better modeling the context and the user's personalized preferences, and making the issue of data sparsity be well eased.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method of determining search results, wherein the method comprises:

obtaining a current query of a user, search history information of the user in a first time period, search history information of the user in a second time period and candidate search results for the current query, and inputting the current query of the user, the search history information of the user in the first time period, the search history information of the user in the second time period and the candidate search results for the current query into a search result ranking model, and determining search results corresponding to the current query according to scores of the candidate search results presented by the search result ranking model, the second time period being greater than the first time period;

wherein the scores of the candidate results presented by the search result ranking model are determined according to first similarity and a second similarity, the first similarity is a similarity between an integration of a vector representation of the current query and a vector representation of the search history information of the user in the first time period, and vector representations of the candidate search results, and the second similarity is a similarity between an integration of the vector representation of the current query and a vector representation of the search history information of the user in the second time period, and vector representations of the candidate search results.

2. The method according to claim 1, wherein the search history information of the user in the first time period comprises: a query sequence before the current query and clicked search results corresponding to respective queries in the query sequence in the same search session;

the search history information of the user in the second time period comprises: queries and clicked search results of the user in the second time period.

3. The method according to claim 2, wherein the vector representation of the search history information of the user in the first time period is obtained in the following manner:

performing weighting process for the vector representations of the queries in the query sequence and vector representations of clicked search results corresponding to the queries by using an attention mechanism, to obtain the vector representation of the search history information of the user in the first time period.

4. The method according to claim 2, wherein the vector representation of the search history information of the user in the second time period is obtained in the following manner:

obtaining a set of queries and a set of clicked search results of the user in the second time period;

performing a word segmentation process for the set of queries and the set of search results, and solving a union to obtain a word set;

performing an encoding process for the word set by using Distributed Bag of Words version of Paragraph Vector PV-DBOW, to obtain the vector representation of the search history information of the user in the second time period.

5. The method according to claim 1, wherein the candidate search results comprise relevant webpages or relevant entities;

the vector representation of the relevant entity is an integrated vector representation of an identification and a name of the relevant entity and an entity description.

6. The method according to claim 5, wherein the method further comprises:

displaying search results corresponding to the current query in a search result page.

7. The method according to claim 1, wherein the method further comprises:

displaying search results corresponding to the current query in a search result page.

8. A method of training a search result ranking model, wherein the method comprises:

obtaining training samples using a search log, the training samples comprising: a sample query, search history information of a user in the first time period before inputting the sample query, search history information of the user in the second time period before inputting the sample query, search results corresponding to the sample query and conditions of the search results being clicked;

training a ranking model with the training samples to achieve a preset training target; an input of the ranking model comprising the sample query, the search history information of the user in the first time period before inputting the sample query, the search history information of the user in the second time period before inputting the sample query, and search results corresponding to the sample query, and an output of the ranking model including scores of the search results; determining scores presented by the ranking model to the search results according to a first similarity and a second similarity, the first similarity is a similarity between an integration of a vector representation of the sample query and a vector representation of the search history information in the first time period, and vector representations of search results, and the second similarity is a similarity between an integration of the vector representation of the sample query and a vector representation of the search history information in the second time period, and vector representations of the search results; the training target comprising: maximizing a relevancy degree between the conditions of search results being clicked and the scores of the search results;

obtaining a search result ranking model by using the trained ranking model.

9. The method according to claim 8, wherein the search history information of the user in the first time period before inputting the sample query comprises: a query sequence before the sample query and clicked search results corresponding to respective queries in the query sequence in the same search session;

the search history information of the user in the second time period before inputting the sample query comprises: queries and clicked search results of the user in the second time period before inputting the sample query.

10. The method according to claim 9, wherein the vector representation of the search history information of the user in the first time period before inputting the sample query is obtained in the following manner:

performing weighting process for the vector representations of the queries in the query sequence and vector representations of clicked search results corresponding to the queries by using an attention mechanism, to obtain the vector representation of the search history information of the user in the first time period.

11. The method according to claim 9, wherein the vector representation of the search history information of the user in the second time period before inputting the sample query is obtained in the following manner:
   obtaining a set of queries and a set of clicked search results of the user in the second time period before inputting the sample query;
   performing a word segmentation process for the set of queries and the set of search results, and solving a union to obtain a word set;
   performing an encoding process for the word set by using Distributed Bag of Words version of Paragraph Vector PV-DBOW, to obtain the vector representation of the search history information of the user in the second time period before inputting the sample query.

12. The method according to claim 8, wherein the search results comprise relevant webpages or relevant entities;
   the vector representation of the relevant entity is an integrated vector representation of an identification and a name of the relevant entity and an entity description.

13. The method according to claim 8, wherein the search results comprise: a first type of search results and a second type of search results;
   the ranking model comprises: a shared vector sub-model, a first ranking sub-model and a second ranking sub-model;
   inputting the sample query, the search history information of the user in the first time period before inputting the sample query, the search history information of the user in the second time period before inputting the sample query and search results corresponding to the sample query into the shared vector sub-model to obtain an integration of a vector representation of the sample query and a vector representation of the search history information in the first time period output by the shared vector sub-model, and an integration of the vector representation of the sample query and a vector representation of the search history information in the second time period output by the shared vector sub-model;
   inputting the output of the shared vector sub-model and the first type of search results of the sample query into the first ranking sub-model to obtain scores of the first type of search results; and inputting the output of the shared vector sub-model and the second type of search results of the sample query into the second ranking sub-model to obtain scores of the second type of search results;
   performing joint training for the first ranking sub-model and second ranking sub-model to achieve a preset training target, the training target comprising: maximizing a relevancy degree between conditions of the first type of search results being clicked and the scores of the first type of search results, and maximizing a relevancy degree between conditions of the second type of search results being clicked and the scores of the second type of search results;
   after completion of the training, obtaining the search result ranking model by using the shared vector sub-model and one of the first ranking sub-model and the second ranking sub-model.

14. The method according to claim 13, wherein the performing the joint training for the first ranking sub-model and second ranking sub-model comprises:
   in a training iteration process, randomly selecting one of the first ranking sub-model and second ranking sub-model each time for training, and using the output of the selected sub-model to update model parameters of the selected sub-model and the shared vector sub-model; or
   in the training iteration process, alternatingly selecting one of the first ranking sub-model and second ranking sub-model each time for training, and using the output of the selected sub-model to update model parameters of the selected sub-model and the shared vector sub-model; or
   in the training iteration process, training both the first ranking sub-model and the second ranking sub-model each time, and using outputs of the first ranking sub-model and second ranking sub-model to update model parameters of all sub-models.

15. An electronic device, comprising:
   at least one processor; and
   a memory communicatively connected with the at least one processor;
   wherein the memory stores instructions executable by the at least one processor, and the instructions are executed by the at least one processor to enable the at least one processor to perform a method of determining search results, wherein the method comprises:
   obtaining a current query of a user, the search history information of the user in a first time period, the search history information of the user in a second time period and candidate search results for the current query;
   inputting the current query of the user, the search history information of the user in the first time period, the search history information of the user in the second time period and the candidate search results for the current query into a search result ranking model, and determining search results corresponding to the current query according to scores of the candidate search results presented by the search result ranking model, the second time period being greater than the first time period;
   wherein the scores of the candidate results presented by the search result ranking model are determined according to first similarity and a second similarity, the first similarity is a similarity between an integration of a vector representation of the current query and a vector representation of the search history information of the user in the first time period, and vector representations of the candidate search results, and the second similarity is a similarity between an integration of the vector representation of the current query and a vector representation of the search history information of the user in the second time period, and vector representations of the candidate search results.

16. The electronic device according to claim 15, wherein the search history information of the user in the first time period comprises: a query sequence before the current query and clicked search results corresponding to respective queries in the query sequence in the same search session;
   the search history information of the user in the second time period comprises:
   queries and clicked search results of the user in the second time period.

17. The electronic device according to claim 16, wherein the vector representation of the search history information of the user in the first time period is obtained in the following manner:

performing weighting process for the vector representations of the queries in the query sequence and vector representations of clicked search results corresponding to the queries by using an attention mechanism, to obtain the vector representation of the search history information of the user in the first time period.

18. The electronic device according to claim 16, wherein the vector representation of the search history information of the user in the second time period is obtained in the following manner:
obtaining a set of queries and a set of clicked search results of the user in the second time period;
performing a word segmentation process for the set of queries and the set of search results, and solving a union to obtain a word set;
performing an encoding process for the word set by using Distributed Bag of Words version of Paragraph Vector PV-DBOW, to obtain the vector representation of the search history information of the user in the second time period.

19. The electronic device according to claim 15, wherein the candidate search results comprise relevant webpages or relevant entities;
the vector representation of the relevant entity is an integrated vector representation of an identification and a name of the relevant entity and an entity description.

20. A non-transitory computer-readable storage medium storing computer instructions therein, wherein the computer instructions are used to cause the computer to perform a method of determining search results, wherein the method comprises:

obtaining a current query of a user, search history information of the user in a first time period, search history information of the user in a second time period and candidate search results for the current query, and inputting the current query of the user, the search history information of the user in the first time period, the search history information of the user in the second time period and the candidate search results for the current query into a search result ranking model, and determining search results corresponding to the current query according to scores of the candidate search results presented by the search result ranking model, the second time period being greater than the first time period;

wherein the scores of the candidate results presented by the search result ranking model are determined according to first similarity and a second similarity, the first similarity is a similarity between an integration of a vector representation of the current query and a vector representation of the search history information of the user in the first time period, and vector representations of the candidate search results, and the second similarity is a similarity between an integration of the vector representation of the current query and a vector representation of the search history information of the user in the second time period, and vector representations of the candidate search results.

* * * * *